United States Patent
Tang et al.

(10) Patent No.: US 8,368,998 B2
(45) Date of Patent: Feb. 5, 2013

(54) PLASMONIC ELECTRONIC SKIN

(75) Inventors: Liang Tang, Vancouver, WA (US); Akinori Hashimura, Vancouver, WA (US); Apostolos T. Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 244 days.

(21) Appl. No.: 12/836,121

(22) Filed: Jul. 14, 2010

(65) Prior Publication Data

US 2011/0109659 A1  May 12, 2011

Related U.S. Application Data (63) Continuation-in-part of application No. 12/646,585, filed on Dec. 23, 2009, now Pat. No. 8,223,425, which is a continuation-in-part of application No. 12/635,349, filed on Dec. 10, 2009, which is a continuation-in-part of application No. 12/621,567, filed on Nov. 19, 2009, which is a continuation-in-part of application No. 12/614,368, filed on Nov. 6, 2009, now Pat. No. 8,045,107.

(51) Int. Cl.
*G02B 26/00* (2006.01)

(52) U.S. Cl. ........ 359/296; 359/452; 359/228; 359/245; 359/315

(58) Field of Classification Search .................. 359/290, 359/228, 245, 277, 296, 322, 452, 585, 586; 349/117, 166, 106; 385/901, 122
See application file for complete search history.

(56) References Cited

U.S. PATENT DOCUMENTS

| 6,753,994 B1 | 6/2004 | Russell |
| 2008/0144179 A1* | 6/2008 | Mimura et al. ............... 359/599 |
| 2009/0034055 A1* | 2/2009 | Gibson ........................ 359/296 |

FOREIGN PATENT DOCUMENTS

| JP | 11-024062 | 1/1999 |
| JP | 2006-343650 | 12/2006 |

OTHER PUBLICATIONS

K.C. Chu et al., Electrically controlled surface plasmon resonance frequency of gold nanorods, Applied Phy Letters, 89, pp. 103107, 2006.

S. Massenot et al., Tunable grating-assisted surface plasmon resonance by use of nano-polymer dispersed liquid crystal electro-optical material, Optical Communications, 275, p.

* cited by examiner

*Primary Examiner* — Thomas K Pham
*Assistant Examiner* — Vipin Patel
(74) *Attorney, Agent, or Firm* — Law Office of Gerald Maliszewski; Gerald Maliszewski (57) ABSTRACT

A method is provided for color tuning a plasmonic device with a color tunable electronic skin. A plasmonic electronic skin is used, including a first substrate, a plasmonic structure, an electrically conductive transparent first electrode layer, an electrically conductive transparent second electrode layer, and a polymer-networked liquid crystal (PNLC) layer interposed between the first and second transparent electrode layers. In response to receiving a color tuning voltage, a full visible spectrum incident light, and a PNLC switch voltage, the plasmonic structure generates a first primary color. A primary color exhibits a single wavelength peak with a spectral full width at half magnitudes (FWHMs) in the visible spectrum of light. In response to receiving the PNLC switch voltage between the first and second electrode layers, the PNLC layer passes incident light.

16 Claims, 5 Drawing Sheets

PLASMONIC ELECTRONIC SKIN

RELATED APPLICATION

The application is a Continuation-in-Part of a application entitled, PLASMONIC DEVICE TUNED USING PHYSICAL MODULATION, invented by Tang et al., Ser. No. 12/646,585, filed on Dec. 23, 2009, now U.S. Pat. No. 8,223,425;

which is a Continuation-in-Part of a pending application entitled, PLASMONIC DEVICE TUNED USING LIQUID CRYSTAL MOLECULE DIPOLE CONTROL, invented by Tang et al., Ser. No. 12/635,349, filed on Dec. 10, 2009,;

which is a Continuation-in-Part of a pending application entitled, PLASMONIC DEVICE TUNED USING ELASTIC AND REFRACTIVE MODULATION MECHANISMS, invented by Tang et al., Ser. No. 12/621,567, filed on Nov. 19, 2009,;

which is a Continuation-in-Part of a application entitled, COLOR-TUNABLE PLASMONIC DEVICE WITH A PARTIALLY MODULATED REFRACTIVE INDEX, invented by Tang et al., Ser. No. 12/614,368, filed on Nov. 6, 2009, now U.S. Pat. No. 8,045,107. All the above-referenced applications are incorporated herein by reference.

BACKGROUND OF THE INVENTION

1. Field of the Invention

This invention generally relates to electronic visual display devices and, more particularly, to a color-tunable plasmonic display device using a polymer-networked liquid crystal (PNLC).

2. Description of the Related Art

Reflective display or color-tunable device technology is attractive primarily because it consumes substantially less power than liquid crystal displays (LCDs) and organic light emitting diode (OLED) displays. A typical LCD used in a laptop or cellular phone requires internal (backlight) illumination to render a color image. In most operating conditions the internal illumination that is required by these displays is in constant competition with the ambient light of the surrounding environment (e.g., sunlight or indoor overhead lighting). Thus, the available light energy provided by these surroundings is wasted, and in fact, the operation of these displays requires additional power to overcome this ambient light. In contrast, reflective display technology makes good use of the ambient light and consumes substantially less power.

A number of different reflective display technologies have been developed, such as electrophoretic, electrowetting, electrochromic displays, and interference-based MEMS display. These display technologies all have disadvantages or challenges that must be overcome to obtain greater commercial success. Many existing technologies rely upon phenomena that are intrinsically slow. For example, electrophoretic or electrochemical techniques typically require particles to drift or diffuse through liquids over distances that create a slow response. Some other technologies require high power to operate at video rates. For example, many reflective displays must switch a large volume of material or chromophores from one state to another to produce an adequate change in the optical properties of a pixel. At video switching rates, currents on the order of hundreds of mA/cm$^2$ are necessary if a unit charge must be delivered to each dye molecule to affect the change. Therefore, display techniques that rely on reactions to switch dye molecules demand unacceptably high currents for displaying video. The same holds true for electrochromic displays.

A second challenge for reflective displays is the achievement of high quality color. In particular, most reflective display technologies can only produce binary color (color/black) from one material set. Because of this, at least three sub-pixels using different material sets must be used when employing a side-by-side sub-pixel architecture with fixed colors. This limits the maximum reflected light for some colors to about $\frac{1}{3}$, so that the pixels of this type cannot produce saturated colors with a good contrast.

Finally, some reflective displays face reliability problem over a long lifetime. In particular, to sustain video rate operation for a few years requires at least billions of reversible changes in optical properties. Achieving the desired number of cycles is particularly difficult in reflective displays using techniques based on chemical reactions, techniques that involve mixing and separation of particles, or MEMS technology that involves repeated mechanic wear or electric stress.

In polymer-networked liquid crystal (PNLC) or polymer dispersed liquid crystal (PDLC) devices, liquid crystals are dissolved or dispersed into a liquid polymer followed by solidification or curing of the polymer. During the change of the polymer from a liquid to solid, the liquid crystals become incompatible with the solid polymer and form droplets throughout the solid polymer. The curing conditions affect the size of the droplets that in turn affect the final operating properties of the "smart window". Typically, the liquid mix of polymer and liquid crystals is placed between two layers of glass or plastic that includes a thin layer of a transparent, conductive material followed by curing of the polymer, thereby forming the basic sandwich structure of the smart window. This structure is in effect a capacitor.

Electrodes from a power supply are attached to the transparent electrodes. With no applied voltage, the liquid crystals are randomly arranged in the droplets, resulting in scattering of light as it passes through the smart window assembly. This scattering results in a translucent "milky white" appearance. When a voltage is applied to the electrodes, the electric field formed between the two transparent electrodes on the glass causes the liquid crystals to align, allowing light to pass through the droplets with very little scattering and resulting in a transparent state. The degree of transparency can be controlled by the applied voltage. This is possible because at lower voltages, only a few of the liquid crystals align completely in the electric field, so only a small portion of the light passes through while most of the light is scattered. As the voltage is increased, fewer liquid crystals remain out of alignment, resulting in less light being scattered. It is also possible to control the amount of light and heat passing through, when tints and special inner layers are used. It is also possible to create fire-rated and anti X-Ray versions for use in special applications. Most of the devices offered today operate in on or off states only, even though the technology to provide for variable levels of transparency is available. This technology has been used in interior and exterior settings for privacy control (for example conference rooms, intensive-care areas, bathroom/shower doors) and as a temporary projection screen.

The full range of colors produced by plasmon resonances resulting from metal nanostructures has been known since ancient times as a means of producing stained colored glass. For instance, the addition of gold nanoparticles to otherwise transparent glass produces a deep red color. The creation of a particular color is possible because the plasmon resonant frequency is generally dependent upon the size, shape, material composition of the metal nanostructure, as well as the dielectric properties of the surroundings environment. Thus, the optical absorption and scattering spectra (and therefore the color) of a metal nanostructure can be varied by altering any one or more of these characteristics. The parent applications listed above describe means of electronically controlling these color-producing characteristics.

Electronic-Skin (e-skin) is an emerging reflective display technology that opens up new design opportunities for personalizing electronic devices. This means that the color and appearance, of the device's surface, for example an MP3 player or mobile phone can easily be changed to match a person's outfit, mood, or environment simply at the touch of a button. The technology also has the potential to be used in the future for larger area 'e-wallpapers' where one can adjust the color of their wall or smart windows to regulate entering daylight.

Currently there is no e-skin technology that satisfies all the specifications required for a successful commercial release: low power consumption, bright color display, good contrast ratio, reasonable switching speed, and low manufacturing cost. Philips recently developed an e-skin technology based on its previous work with electronic paper. The e-paper looks like conventional paper and the color it generates uses the ambient light for rendition, just like conventional paint, so no backlight is needed, which means that the vividness of the color is maintained, even in bright outdoor conditions. However, its multiple-layer electro-wetting structure is difficult to manufacture and relatively expensive.

It would be advantageous if PNLC could be integrated with plasmonic color display technology to create new and useful e-skin displays.

SUMMARY OF THE INVENTION

Disclosed herein is a novel Electronic-Skin (e-skin) technology with a simple device structure. Similar to paper, the e-skin has a paint-like appearance. Because the e-skin makes use of the ambient light, it is an inherently energy-efficient system, making it particularly suitable for applications in portable electronic devices. The device integrates a PNLC (Polymer-Networked Liquid Crystal) layer with a plasmonic layer. PNLC has two different states: the scattering state and the transparent state. Because the plasmonic layer scatters light strongly at visible wavelengths, the integrated device can display at least two states: white (or black) and a visible color of choice. The visible color is primarily determined by the plasmonic layer. If the plasmonic resonance is further electrically-tunable, then there can be more than two states, i.e. white (or black) and more than one visible color.

The first applications using the technology could be e-skins for small devices such as MP3 players or cell phones. However, the technology is highly scalable. In the future it will be possible to use e-skins to bring new color and a new aura or 'vibe' to much larger equipment.

Accordingly, a method is provided for color tuning a plasmonic device with a color tunable electronic skin. A plasmonic electronic skin is used, including a first substrate, a plasmonic structure, an electrically conductive transparent first electrode layer, an electrically conductive transparent second electrode layer, and a PNLC layer interposed between the first and second transparent electrode layers. In response to receiving a color tuning voltage, a full visible spectrum incident light, and a PNLC switch voltage, the plasmonic structure generates a first primary color. A primary color exhibits a single wavelength peak with a spectral full width at half magnitudes (FWHMs) in the visible spectrum of light. In response to receiving the PNLC switch voltage between the first and second electrode layers, the PNLC layer passes incident light.

In one aspect, the device sequentially receives a plurality of color tuning voltages, and the plasmonic structure sequentially generates a corresponding plurality of primary colors in response to the plurality of color tuning voltages. In another aspect, the PNLC layer scatters incident light in response to supplying a PNLC switch voltage below a minimum threshold.

Additional details of the above-described method, as well as a plasmonic device with a color tunable electronic skin, are provided below.

DETAILED DESCRIPTION

Figure 1:
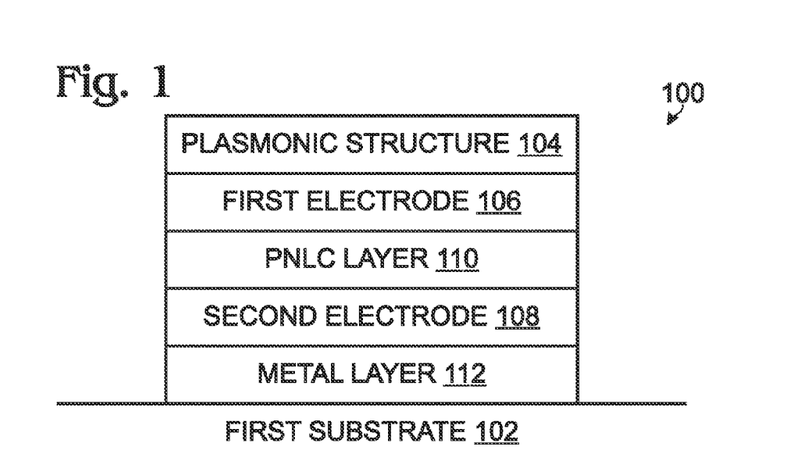
FIG. 1 is a partial cross-sectional view of a plasmonic device with a color tunable electronic skin.

FIG. 1 is a partial cross-sectional view of a plasmonic device with a color tunable electronic skin. The device 100 comprises a first substrate 102 and a plasmonic structure 104. The device also comprises an electrically conductive transparent first electrode layer 106 and an electrically conductive transparent second electrode layer 108. A polymer-networked liquid crystal (PNLC) layer 110 is interposed between the first transparent electrode layer 106 and the second transparent electrode layer 108.

As shown in the figure, a reflective metal layer 112 overlies the first substrate, and the transparent second electrode layer 108 overlies the reflective metal layer 112. The plasmonic structure 104 overlies the first transparent first electrode layer 106. For example, indium tin oxide (ITO) or ZnO can be used as a transparent electrode, and Al, Ti, or Cu can be used as a reflective material.

Figure 2:
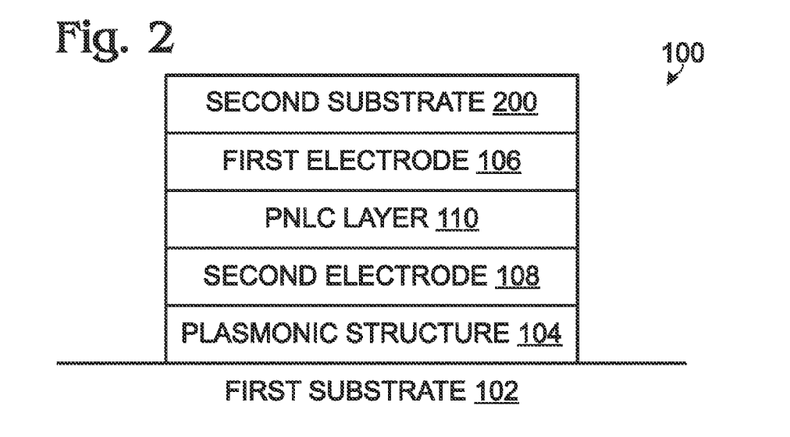
FIG. 2 is a partial cross-sectional view of a variation of the plasmonic device of FIG. 1.

FIG. 2 is a partial cross-sectional view of a variation of the plasmonic device of FIG. 1. The device 100 includes a transparent second substrate layer 200. The plasmonic structure 104 overlies the first substrate 102. The transparent second electrode layer 108 overlies the plasmonic structure 104, and the transparent second substrate 200 overlies the first transparent first electrode layer 106.

In its simplest form, the plasmonic structure 104 is a layer of discrete plasmonic particles that can be deposited over the substrate 102, the PNLC layer 110, the first electrode 106, or the second electrode 108 of the devices depicted in FIGS. 1 and 2. With respect to the device of FIG. 2, the discrete plasmonic particles can be deposited over the second substrate 200. With respect to the device of FIG. 1, the discrete plasmonic particles can be deposited over the reflective metal layer 112. This type of plasmonic structure generates a single color response, depending upon the particles shapes, sizes, and distributions, since it is not electrically tunable.

In another aspect, the plasmonic structure can be randomly-distributed nanoparticles embedded in a dielectric material. For example, the nanoparticles may not be on the same plane. They can be randomly distributed throughout the volume of the dielectric material.

Some plasmonic particle shapes include spherical, disk, composite shell, dome, egg, cup, rod, bar, pyramid, and star. Note: the composite shell structure may comprise a metal core surrounded by a dielectric shell, or a dielectric core surrounded by a metal shell. In one aspect, the composite shell dielectric may have a refractive index that varies in response to electric fields. It should also be noted that the plasmonic layer may be comprised of a plurality of (different) particle shapes. The plasmonic particles may have a uniform size or the plasmonic layer may be comprised of a plurality of particle sizes. Typically, the plasmonic particles have a size or diameter in the range of 10 nanometers (nm) to 300 nm. Some plasmonic particle materials include Ag, Au, Cu, Pt, Al, and alloys of the above-mentioned metals. The plasmonic particles may have an average spacing between particles, which is typically in the range of about 700 nm, or less.

In one aspect, a plasmonic layer is fabricated by e-beam evaporation of a thin Ag layer followed by an annealing process. During the annealing, nanoparticle grains are formed on the substrate due to surface tension. In another aspect, Ag nanoparticles are chemically synthesized and dispersed in organic solvents. After drop-casting the solution and evaporating the solvent, only the particles are left on the substrate. Some of the Ag nanoparticles are then covered by a very thin layer of dielectric such as silicon nitride, for both color-tuning and passivation purposes. The particle density, size, and shape can be modified with different process parameters.

Figure 3:
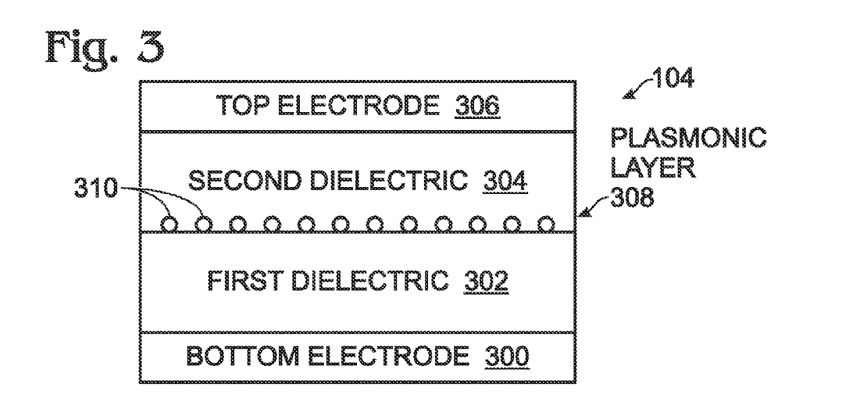
FIG. 3 is a partial cross-sectional view of a color tunable plasmonic structure with a partially modulated refractive index.

FIG. 3 is a partial cross-sectional view of a color tunable plasmonic structure with a partially modulated refractive index. In this aspect the plasmonic structure 104 of FIG. 1 or 2 includes an electrically conductive bottom electrode 300. A first dielectric layer 302 overlies the bottom electrode, having a refractive index non-responsive to an electric field. A second dielectric layer 304 overlies the first dielectric layer 302 having a refractive index responsive to an electric field. An electrically conductive top electrode 306 overlies the second dielectric layer 304. A plasmonic layer 308, including a plurality of discrete plasmonic particles 310, is interposed between the top and bottom electrodes 306/300.

As described in more detail in the parent application entitled, COLOR-TUNABLE PLASMONIC DEVICE WITH A PARTIALLY MODULATED REFRACTIVE INDEX, invented by Tang et al., Ser. No. 12/614,368, filed on Nov. 6, 2009, similar devices can be made by interposing the plasmonic particles between the first dielectric layer and the bottom electrode. In another aspect, plasmonic particles can be interposed between the first and second dielectric layers, as shown in FIG. 3, as well as between the first dielectric layer and the bottom electrode.

Figure 4:
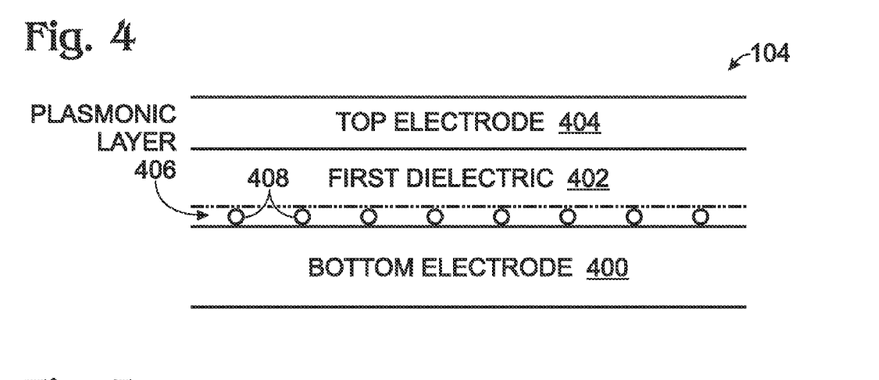
FIG. 4 is a partial cross-sectional view of a color tunable plasmonic structure that is tuned using physical modulation.

FIG. 4 is a partial cross-sectional view of a color tunable plasmonic structure that is tuned using physical modulation. In this aspect the plasmonic structure 104 of FIG. 1 or 2 includes an electrically conductive bottom electrode 400. A first dielectric layer 402 overlies the bottom electrode 400, made from a piezoelectric material having an index of expansion responsive to an electric field. An electrically conductive top electrode 404 overlies the first dielectric layer 402. A first plasmonic layer 406, including a plurality of discrete plasmonic particles 408, is interposed between the top electrode 404 and bottom electrode 400, in contact with the first dielectric layer 402.

Additional details of the physically modulated plasmonic structure are provided in the parent application entitled, PLASMONIC DEVICE TUNED USING ELASTIC AND REFRACTIVE MODULATION MECHANISMS, invented by Tang et al., Ser. No. 12/621,567, filed on Nov. 19, 2009.

Figure 5:
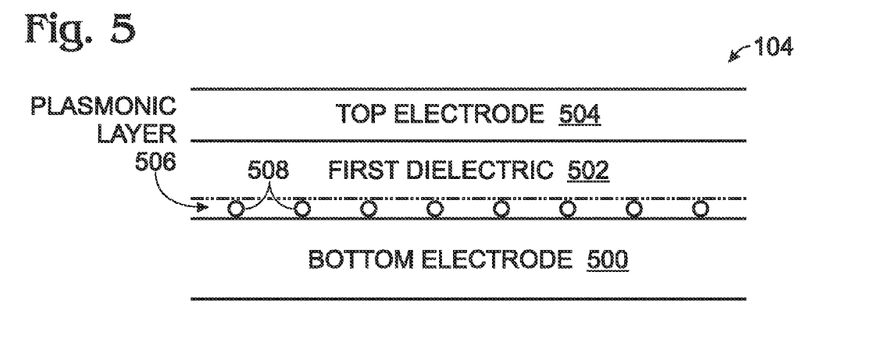
FIG. 5 is a partial cross-sectional view of a color tunable plasmonic structure that is tuned using elastic and refractive modulation mechanisms.

FIG. 5 is a partial cross-sectional view of a color tunable plasmonic structure that is tuned using elastic and refractive modulation mechanisms. In this aspect the plasmonic structure 104 of FIG. 1 or 2 includes an electrically conductive bottom electrode 500. A first dielectric layer 502 overlies the bottom electrode 500, made from an elastic polymer material having a refractive index responsive to an electric field. An electrically conductive top electrode 504 overlies the first dielectric layer 502. A plasmonic layer 506 including a plurality of discrete plasmonic particles 508 is interposed between the top and bottom electrodes 504/500 and in contact with the first dielectric layer 502. The first dielectric 502 may be a material such as liquid crystal elastomer or polymer-networked liquid crystal.

Additional details of the above-described plasmonic structure can be found in the parent application entitled, PLASMONIC DEVICE TUNED USING ELASTIC AND REFRACTIVE MODULATION MECHANISMS, invented by Tang et al., Ser. No. 12/621,567, filed on Nov. 19, 2009.

Figure 6:
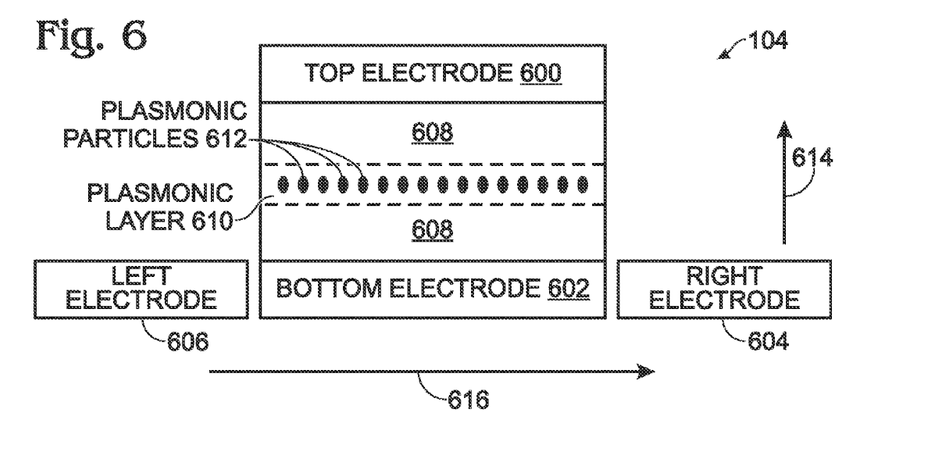
FIG. 6 is a partial cross-sectional view of a color tunable plasmonic structure that is tuned using liquid crystal molecule dipole control.

FIG. 6 is a partial cross-sectional view of a color tunable plasmonic structure that is tuned using liquid crystal molecule dipole control. In this aspect the plasmonic structure 104 of FIGS. 1 and 2 includes a first set of electrodes including at least one electrically conductive top electrode 600 and at least one electrically conductive bottom electrode 602 capable of generating a first electric field in a first direction 614. A second set of electrodes includes an electrically conductive "right" electrode 604 and an electrically conductive "left" electrode 606 capable of generating a second electric field in a second direction 616. A dielectric layer 608 overlies the bottom electrode 602, made from a liquid crystal material with molecules having dipoles responsive to an electric field. A plasmonic layer 610, including a plurality of discrete plasmonic particles 612, is interposed between the first and second set of electrodes and is in contact with the dielectric layer 608.

Additional details of the plasmonic structure are found in the parent application entitled, PLASMONIC DEVICE TUNED USING LIQUID CRYSTAL MOLECULE DIPOLE CONTROL, invented by Tang et al., Ser. No. 12/635,349, filed on Dec. 10, 2009.

Functional Description

Plasmons, which are quantized oscillations of the free electron gas in a metal or other material, affect how light interacts with a structure and thereby determine the apparent color of the structure. This generally occurs through the coupling of surface plasmons with light to form surface plasmon-polaritons. Tuning the color of a metal nanostructure is possible because the plasmon resonant frequency of such structures generally depends on the size, shape and the dielectric properties of the surrounding material. Thus, the optical absorption and scattering spectra (and therefore the color) of a metal structure can be varied by altering any one or more of these characteristics.

Figure 7:
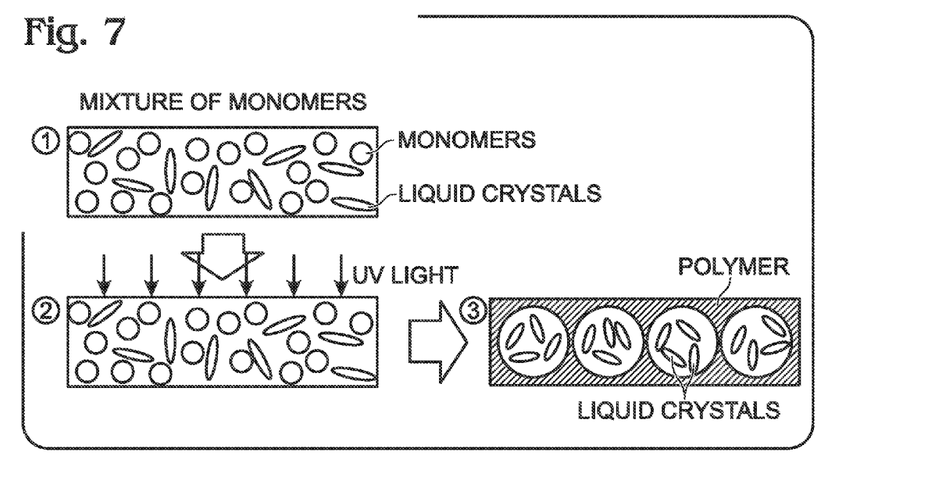
FIG. 7 is a diagram depicting the principles of PNLC fabrication.

FIG. 7 is a diagram depicting the principles of PNLC fabrication. A PNLC layer has a micro-separated structure of liquid crystals and polymer networks. It is manufactured by irradiating mixture of monomers, liquid crystals and photo initiator under ultra-violet light.

FIGS. 1 and 2 disclose two different configurations of a plasmonic e-skin: one with the plasmonic layer underneath the PNLC, and the other with the plasmonic layer above PNLC. The first configuration (FIG. 2) provides at least two states: white and a visible color of choice (determined by the plasmonic layer). The second configuration (FIG. 1) further includes a reflector (e.g., Al) over the bottom substrate. This configuration enables at least two states: black and a visible color of choice (again, determined by the plasmonic layer).

No polarizers are used in either device, so the images are displayed by switching the PNLC layer between the scattering state and the transparent state. The scattering PNLC breaks the specular reflection. The observer sees light and recognizes the images as a bright (white) state, at all viewing angles. The transparent PNLC realizes the mirror reflection. Other than the specular direction, the observer sees no light and recognizes the images as dark (black). Typically, the PNLC exhibits a white color. In the white state, 0V are applied to the PNLC. In the black state, a voltage is applied to the PNLC.

Figure 8:
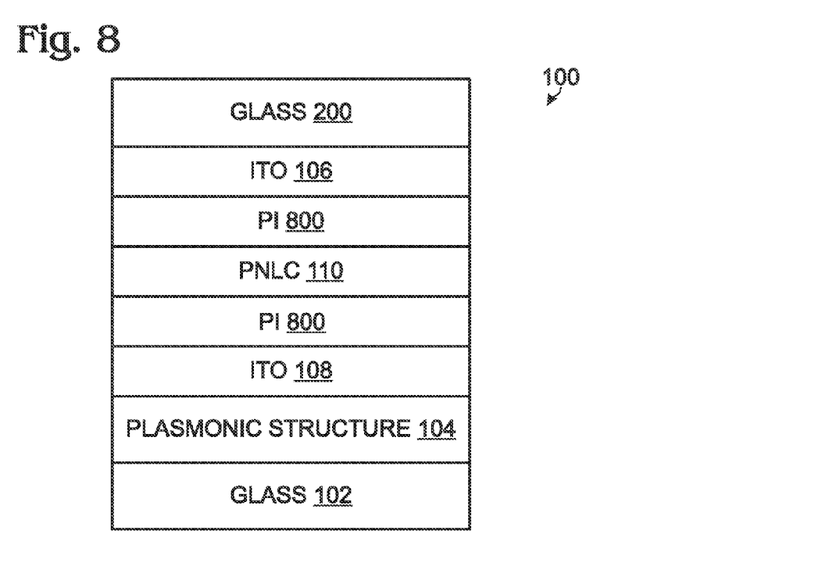
FIG. 8 is a partial cross-sectional view of a more detailed example of the device of FIG. 2, where the plasmonic layer underlies the PNLC layer.

FIG. 8 is a partial cross-sectional view of a more detailed example of the device of FIG. 2, where the plasmonic layer underlies the PNLC layer. The PI (polyimide) layers 800 are used to anchor the liquid crystal molecules. ITO layers 106/108 are used to impose a bias voltage across PNLC 110.

Figure 9:
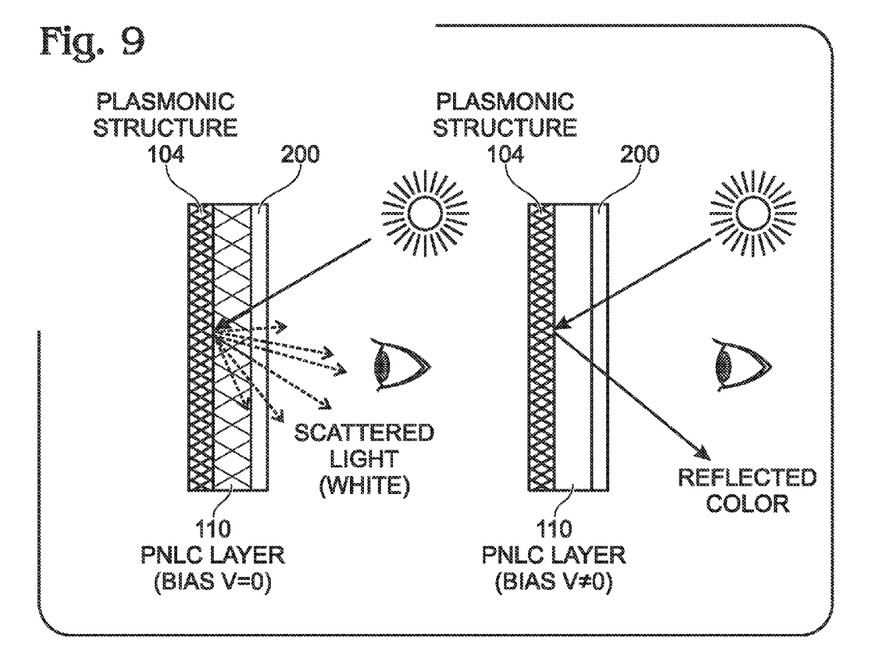
FIG. 9 is a diagram depicting the principles of operation behind the device of FIG. 8.

FIG. 9 is a diagram depicting the principles of operation behind the device of FIG. 8. The device 100 shows white color when 0 volts are applied to PNLC 100, and displays a visible color of choice when an AC voltage is applied to PNLC.

Figure 10:
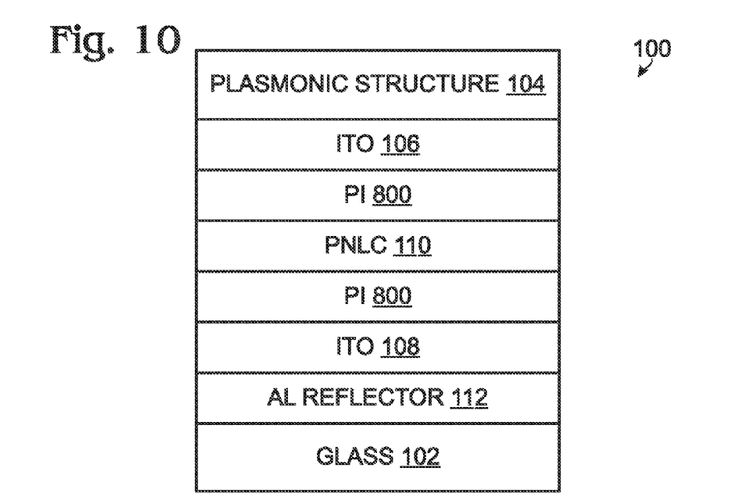
FIG. 10 is a partial cross-sectional view of a more detailed example of the device of FIG. 1, where the plasmonic layer overlies the PNLC layer.

FIG. 10 is a partial cross-sectional view of a more detailed example of the device of FIG. 1, where the plasmonic layer overlies the PNLC layer. In this scenario, the plasmonic structure 104 performs in a manner similar to a color filter. The device 100 shows a visible color when 0 volts are applied to PNLC 110, and shows black when an AC voltage is applied to PNLC.

Figure 11:
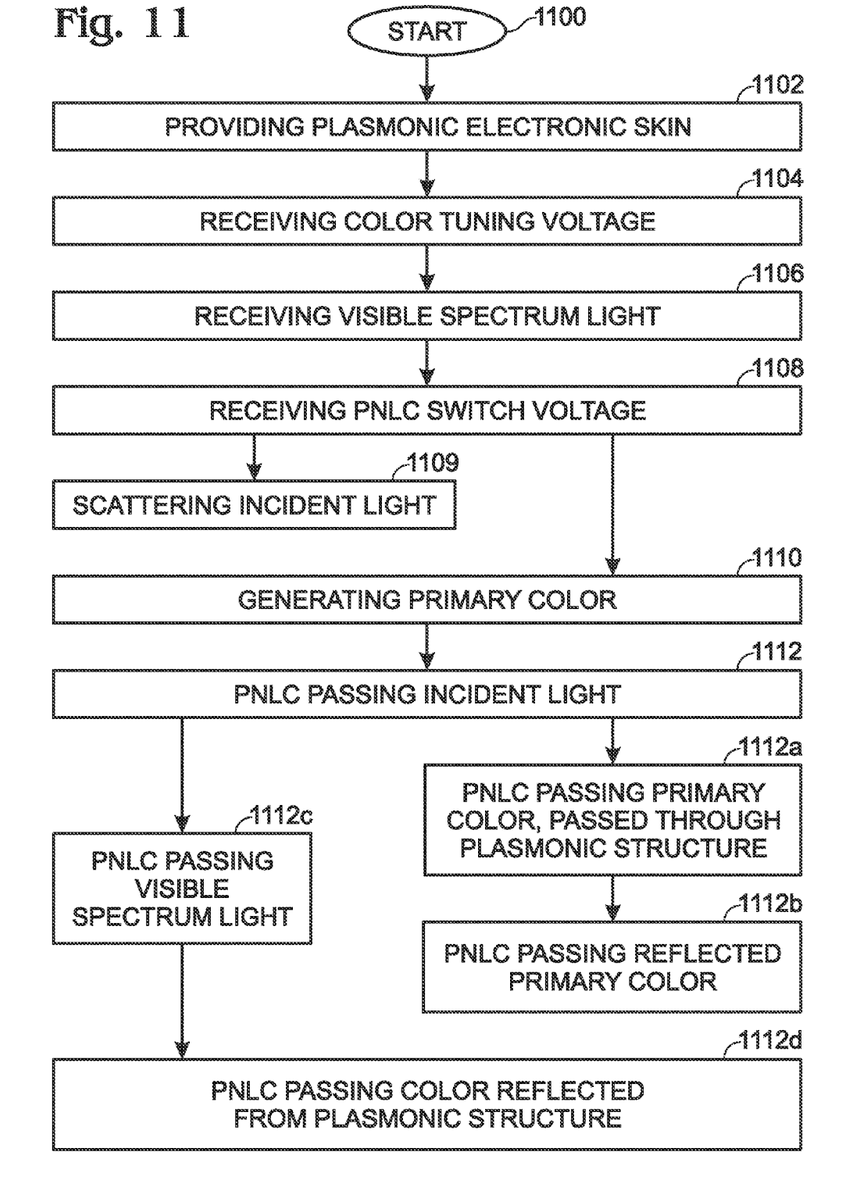
FIG. 11 is a flowchart illustrating a method for color tuning a plasmonic device with a color tunable electronic skin.

FIG. 11 is a flowchart illustrating a method for color tuning a plasmonic device with a color tunable electronic skin. Although the method is depicted as a sequence of numbered steps for clarity, the numbering does not necessarily dictate the order of the steps. It should be understood that in some aspects of the method these steps may be skipped, performed in parallel, or performed without the requirement of maintaining a strict order of sequence. Generally however, the steps are performed in numerical order. The method starts at Step 1100.

Step 1102 provides a plasmonic electronic skin including a first substrate, a plasmonic structure, an electrically conductive transparent first electrode layer, an electrically conductive transparent second electrode layer, and a PNLC layer interposed between the first and second transparent electrode layers. Step 1104 receives a color tuning voltage that is applied to the plasmonic structure. Note: if the plasmonic structure is not tunable, this step is not performed. Step 1106 receives full visible spectrum incident light. Step 1108 receives a PNLC switch voltage that is applied between the first and second electrodes. In Step 1110 the plasmonic structure generates a first primary color in response to the color tuning voltage and incident light. A primary color exhibits a single wavelength peak with a spectral full width at half magnitudes (FWHMs) in the visible spectrum of light. In response to receiving the PNLC switch voltage between the first and second electrode layers, the PNLC layer passes incident light in Step 1112.

In one aspect, Step 1104 sequentially receives a plurality of color tuning voltages. Then in Step 1110, the plasmonic structure sequentially generates a corresponding plurality of primary colors in response to the plurality of color tuning voltages.

In another aspect, the PNLC layer scatters incident light in Step 1109 in response to receiving a PNLC switch voltage below a minimum threshold in Step 1108.

In one variation of the method, Step 1102 provides a reflective metal layer overlying the transparent first substrate, where the transparent second electrode layer overlies the reflective metal layer and the plasmonic structure overlies the first transparent first electrode layer. Then, the PNLC layer passing incident light in Step 1112 includes substeps. In Step 1112a, the PNLC layer passes the primary color light, which previously passed through the plasmonic structure. In Step 1112b, the PNLC layer passes the primary color light reflected off the reflective metal layer. If the PNLC switch voltage supplied in Step 1108 is below the minimum threshold, the PNLC layer reflects a black color light in Step 1109.

In another variation, Step 1102 provides a transparent second electrode layer, where the plasmonic structure overlies the transparent first substrate. The transparent second electrode layer overlies the plasmonic layer, and the transparent second substrate overlies the first transparent first electrode layer. Then, the PNLC layer passing the incident light in Step 1112 includes different substeps. In Step 1112c, the PNLC layer passes full spectrum visible light to the plasmonic structure. In Step 1112d, the PNLC layer passes the first primary color reflected from the plasmonic structure. If the PNLC switch voltage supplied in Step 1108 is below the minimum threshold, the PNLC layer reflects a white color light in Step 1109.

A plasmonic device with a color-tunable electric skin is provided, along with an associated tuning method. Examples of specific materials and structures have been used to illustrate the invention. However, the invention is not limited to merely these examples. Other variations and embodiments of the invention will occur to those skilled in the art.

We claim:

1. A plasmonic device with a color tunable electronic skin, the device comprising:
   a first substrate;
   a plasmonic structure having top and bottom electrodes and configured to generate a plasmon resonance in response to a color tuning voltage applied between the top and bottom electrodes;
   an electrically conductive transparent first electrode layer;
   an electrically conductive transparent second electrode layer; and,
   a polymer-networked liquid crystal (PNLC) layer interposed between the first and second transparent electrode layers, and configured to control a degree of transparency in response to a switch voltage applied between the first and second electrode layers.

2. The device of claim 1 further comprising:
   a reflective metal layer overlying the first substrate;
   wherein the transparent second electrode layer overlies the reflective metal layer; and, wherein the plasmonic structure overlies the first transparent first electrode layer.

3. The device of claim 1 further comprising:
a transparent second substrate layer;
wherein the plasmonic structure overlies the first substrate;
wherein the transparent second electrode layer overlies the plasmonic structure; and,
wherein the transparent second substrate overlies the first transparent first electrode layer.

4. The device of claim 1 wherein the plasmonic structure includes:
a first dielectric layer overlying the bottom electrode, having a refractive index non-responsive to an electric field;
a second dielectric layer overlying the first dielectric layer having a refractive index responsive to an electric field, the second dielectric layer underlying the to electrode; and,
a first plasmonic layer including a plurality of discrete plasmonic particles, interposed between the top and bottom electrodes.

5. The device of claim 1 wherein the plasmonic structure includes:
a first dielectric layer overlying the bottom electrode and underlying the top electrode, made from a piezoelectric material having an index of expansion responsive to an electric field; and,
a first plasmonic layer including a plurality of discrete plasmonic particles, interposed between the top and bottom electrodes and in contact with the first dielectric layer.

6. The device of claim 1 wherein the plasmonic structure includes:
a first dielectric layer overlying the bottom electrode and underlying the to electrode, made from an elastic polymer material having a refractive index responsive to an electric field; and,
a first plasmonic layer including a plurality of discrete plasmonic particles, interposed between the top and bottom electrodes and in contact with the first dielectric layer.

7. The device of claim 1 wherein the plasmonic structure includes:
a first set of electrodes comprising the top electrode and bottom electrode capable of generating a first electric field in a first direction;
a second set of electrodes including an electrically conductive right electrode and an electrically conductive left electrode capable of generating a second electric field in a second direction;
a dielectric layer overlying the bottom electrode, made from a liquid crystal material with molecules having dipoles responsive to an electric field; and,
a plasmonic layer including a plurality of discrete plasmonic particles, interposed between the first and second set of electrodes and in contact with the dielectric layer.

8. The device of claim 1 wherein the plasmonic structure includes discrete plasmonic particles formed in a dielectric layer.

9. A method for color tuning a plasmonic device with a color tunable electronic skin, the method comprising:
providing a plasmonic electronic skin including a first substrate, a plasmonic structure, an electrically conductive transparent first electrode layer, an electrically conductive transparent second electrode layer, and a polymer-networked liquid crystal (PNLC) layer interposed between the first and second transparent electrode layers;
receiving a color tuning voltage;
receiving full visible spectrum incident light;
receiving a PNLC switch voltage;
the plasmonic structure generating a first primary color in response to the color tuning voltage and incident light, where a primary color exhibits a single wavelength peak with a spectral full width at half magnitudes (FWHMs) in the visible spectrum of light; and,
in response to receiving the PNLC switch voltage between the first and second electrode layers, the PNLC layer passing incident light.

10. The method of claim 9 further comprising:
sequentially receiving a plurality of color tuning voltages; and,
the plasmonic structure sequentially generating a corresponding plurality of primary colors in response to the plurality of color tuning voltages.

11. The method of claim 9 further comprising:
in response to receiving a PNLC switch voltage below a minimum threshold, the PNLC layer scattering incident light.

12. The method of claim 11 wherein providing the plasmonic electronic skin further includes providing a reflective metal layer overlying the first substrate, where the transparent second electrode layer overlies the reflective metal layer and the plasmonic structure overlies the first transparent first electrode layer;
wherein the PNLC layer passing incident light includes:
the PNLC layer passing the primary color light passed through the plasmonic structure; and,
the PNLC layer passing the primary color light reflected off the reflective metal layer.

13. The method of claim 12 wherein the PNLC layer scattering the incident light in response to the below minimum threshold PNLC switch voltage includes the PNLC layer reflecting a black color light.

14. The method of claim 11 wherein providing the plasmonic electronic skin additionally includes providing a transparent second electrode layer, where the plasmonic structure overlies the first substrate, the transparent second electrode layer overlies the plasmonic layer, and the transparent second substrate overlies the first transparent first electrode layer;
wherein the PNLC layer passing the incident light includes:
the PNLC layer passing full spectrum visible light to the plasmonic structure; and,
the PNLC layer passing the first primary color reflected from the plasmonic structure.

15. The method of claim 14 wherein the PNLC layer scattering the incident light in response to the below minimum threshold PNLC switch voltage includes the PNLC layer reflecting a white color light.

16. A plasmonic device with a color tunable electronic skin, the device comprising:
a first substrate;
a plasmonic structure comprising:
a first set of electrodes including a top electrode an I a bottom electrode capable of generating a first electric field in a first direction;
a second set of electrodes including a right electrode and a left electrode capable of generating a second electric field in a second direction, orthogonal to the first direction;

a dielectric layer overlying the bottom electrode, made from a liquid crystal material with molecules having dipoles responsive to an electric field; and, a plasmonic layer including a plurality of discrete plasmonic particles, interposed between the first and second set of electrodes and in contact with the dielectric layer;

an electrically conductive transparent first electrode layer;

an electrically conductive transparent second electrode layer; and, a polymer-networked liquid crystal (PNLC) layer interposed between the first and second transparent electrode layers.

* * * * *

UNITED STATES PATENT AND TRADEMARK OFFICE
CERTIFICATE OF CORRECTION

PATENT NO.          : 8,368,998 B2
APPLICATION NO.     : 12/836121
DATED               : February 5, 2013
INVENTOR(S)         : Liang Tang et al.

It is certified that error appears in the above-identified patent and that said Letters Patent is hereby corrected as shown below:

In Claim 6, column 9, line 34: the word "top" has been incorrectly printed as "to".

In Claim 16, column 10, line 61: the word "and" has been incorrectly printed as "an I".

Signed and Sealed this
Second Day of April, 2013

Teresa Stanek Rea
*Acting Director of the United States Patent and Trademark Office*